J. B. WILLIAMS.

REVERSIBLE FLUSH VALVE.

APPLICATION FILED DEC. 21, 1914.

Reissued May 4, 1915.

13,913.

WITNESSES:

Charles Rebele

Thos Eastberg.

INVENTOR

John B. Williams.

BY G. H. Strong.

ATTORNEY

UNITED STATES PATENT OFFICE.

JOHN B. WILLIAMS, OF SAN FRANCISCO, CALIFORNIA, ASSIGNOR, BY MESNE ASSIGNMENTS, TO PERFECTION VALVE COMPANY, A CORPORATION OF CALIFORNIA.

REVERSIBLE FLUSH-VALVE.

13,913. Specification of Reissued Letters Patent. Reissued May 4, 1915.

Original No. 1,062,868, dated May 27, 1913, Serial No. 701,303. Application for reissue filed December 21, 1914. Serial No. 878,454.

*To all whom it may concern:*

Be it known that I, JOHN B. WILLIAMS, a citizen of the United States, residing in the city and county of San Francisco and State of California, have invented new and useful Improvements in Reversible Flush-Valves, of which the following is a specification.

This invention relates to a flushing apparatus for use in connection with toilets and the like.

The object of the invention is to provide a flushing valve which is reversible, that is, one in which the water connections may be easily reversed so that the intake and discharge ports are readily interchangeable, thereby facilitating installations under varying conditions; and which valve is simple and substantial in construction, and by the use of which a storage tank, or like appliance, may be eliminated, thereby lowering the cost of installation and reducing the space required to a minimum.

The invention consists of the parts and the construction and combination of parts as hereinafter more fully described and claimed, having reference to the accompanying drawings, in which—

Figure 1:
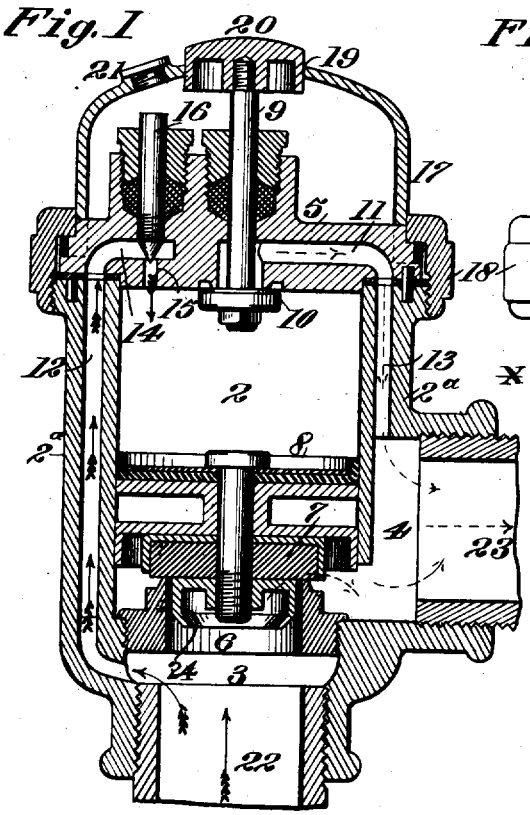
Figure 2:
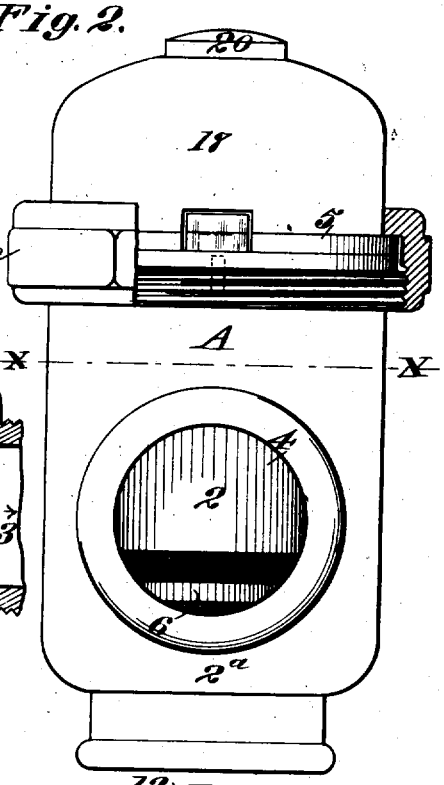
Figure 4:
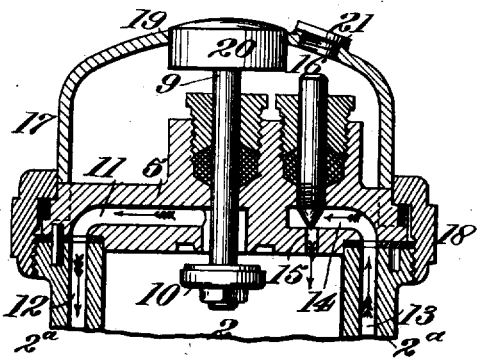
Figure 3:
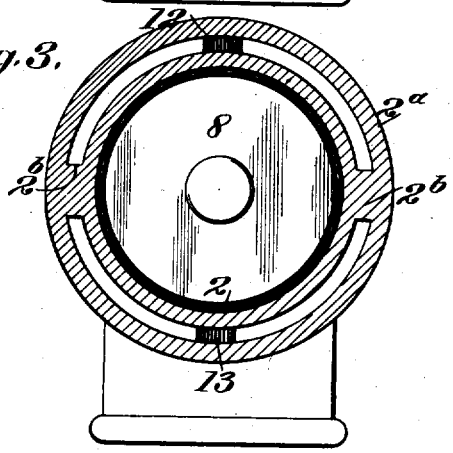

Figure 1 is a vertical section of the valve. Fig. 2 is a side elevation of same, partly broken away. Fig. 3 is a cross section on the line X—X of Fig. 2. Fig. 4 is a vertical section of the upper portion of the valve, showing the cylinder head in the reverse position.

The main object of the invention is to construct a flush valve which is simple and compact in construction, and which valve may be adjusted to reverse the flow of water through the intake and discharge connections when so desired to make the intake connection the discharge and the discharge connection the intake, or vice versa; this is a very desirable feature, as it provides a flush valve that can be installed in combination with almost any make of water closet, and which can be installed in any position when it is necessary to reduce space to a minimum.

The flush valve, as shown in the accompanying drawings, is a structural embodiment of the invention in a device with the aid of which water, in large enough quantities, is admitted to operate the toilet; the flush valve being automatic and adjustable to allow any desired quantity, within certain limits, to flow.

The flush valve consists of a casing A, having an interior cylindrical portion 2, and an outer casing $2^a$, the interior cylindrical portion and the outer casing being joined together by partitions $2^b$ which may be integral with the cylindrical portion and the outer casing. The casing A is provided with intake and discharge openings 3 and 4, which may be changed to discharge and intake openings, by changing the position of a set of valve ports in a cylinder head 5, which will later be described.

The lower end 3 of the valve casing which opens into the cylinder 2, is provided with a brass bushing 6, which forms a seat for the valve 7 carried by a piston 8, which latter operates in the cylinder 2. The upper end of the cylinder is closed by the cylinder head 5, through which passes a stem 9, the inner end of which carries a valve 10, which normally closes a radial discharge passage 11 in the cylinder head. This passage 11 is adapted to register with either one or the other of a pair of vertically disposed ducts 12 and 13; in Fig. 1 of the drawings I have shown it as registering with duct 13, which connects with the discharge opening 4. The passage 11 and registered duct 13 form a discharge outlet through which counterbalancing fluid pressure contained within the cylindrical valve chamber 2 may be exhausted when the valve 10 is opened; thus fluid pressure at the intake, which in the present instance is the connection 3, is permitted to open the main or flush valve 7. I have also shown a second radial passage 14 in the cylinder head, which is provided with a restricted or choked inlet opening 15, leading into the cylinder 2. When passage 11 is in registration with duct 13 passage 14 will register with duct 12 which leads from the intake connection 3; accordingly the two registered passages 14, 12, form an inlet through which the counterbalancing fluid pressure tending to seat the main valve 7 is supplied to the valve chamber 2. The area of the inlet opening may be regulated by a needle valve 16, mounted in the cylinder head, which is adjustable to regulate the flow of water from the radial passage into the cylinder. The radial passage 14 in the present embodiment of the invention is disposed exactly opposite to the passage 11, or at an angle of 180°, and registers with the vertical duct 12, which connects with the opening 3.

The cylinder head is incased by a cover portion 17, which together with the cylinder head is clamped to the valve casing by the lock ring 18. The outer cover 17 is shown as provided with an opening 19, through which passes the stem 9, which is provided with a push-button 20 on its outer end. I have also shown the cover provided with a screw plug 21 which may be removed when it is desired to adjust the needle valve 16.

With the parts assembled and suitable connections made with the main 22 and the discharge pipe 23, which may connect with a water closet or the like, not here shown, the operation is as follows: Normally, valve 7 is closed to interrupt the flow of water from the supply main 22 to the discharge pipe 23. Since the cylinder chamber 2 above the piston 8 remains always in communication with the main, through the passages 12, 14 and 15, and the piston being of larger area than the valve 7, the counterbalancing pressure on the top-side of the piston will be more than sufficient to hold the valve 7 closed. When it is desired to flush the bowl, it is only necessary to push in on button 20. This action opens valve 10, which instantly relieves the pressure on the top of the valve piston 8, and throws it into an unbalanced state by allowing the water in the cylinder chamber 2, to empty into the discharge opening 4 through passage 11 and duct 13; the inlet opening 15 from passage 14 being comparatively much smaller than the outlet through valve 10, will have very little effect in retarding the upward movement of the piston, which jumps almost instantly to the top of the cylinder on the operation of the push-button. The valve 10 is closed by the piston striking the valve, and the cylinder chamber above the piston 8 will immediately begin to fill through the inlet opening 15, and force the piston back to its normal closed position. The flushing of the water closet takes place during the period that it takes the piston to travel back and reseat the valve 7. By adjusting the needle valve 16 more or less, this period may be prolonged or shortened as the needs of a particular case require. This operation insures the prompt working of the closet, for the sudden rush of a small quantity of water under pressure is much more effective in flushing than a large quantity of water run in at a slower rate from a tank.

In flushing the bowl of a toilet it is always desirable to choke off the inrushing water after the actual flushing of the bowl has been accomplished, so as to leave the bowl part of the toilet full of water, which is accomplished in this instance by providing the valve 7 with a cylindrical extension 24, which also acts as a nut to hold the valve 7 in position against the piston 8. It can plainly be seen that as the piston moves down to seat the valve 7, the cylindrical extension 24 will enter the circular opening of the valve seat 6, and gradually decrease the volume of water coming from the main 22, thus producing the desired action, which allows the bowl of the toilet to refill.

The important feature of this invention is the provision of means whereby the flow of water through the casing may be reversed so that it will be possible to connect either of the connections 3 or 4 with the main or supply pipe 22, or the discharge pipe 23, which connects with the bowl of the toilet. This is a very desirable feature as it provides a flush valve that can be installed in any position or in combination with almost any make of water closet.

In Fig. 1 of the drawings I have shown the flush valve connected with the main or supply pipe 22 through the opening 3, and discharging through the opening 4, but, however, if a flush valve should be installed in a position where it would prove more practical or convenient to connect it with the main or supply pipe 22 through the opening 4, (which has previously been described as the discharge opening), and connect the opening 3, (which has previously been described as the intake opening), with the discharge pipe, it will only be necessary to change or reverse the position of the cylinder head 5, to make the intake passage 14 register with the duct 13, which now communicates with the intake side of the flush valve, and the discharge passage 11, register with the vertical duct 12, which now communicates with the discharge pipe, thereby reversing the functions of the ducts relative to control of the counterbalancing fluid pressure above the piston 8. The reversed position of the cylinder head is shown in Fig. 3 of the drawings. The reversing of the cylinder head is accomplished by unscrewing the lock ring which leaves the cover portion and cylinder head free to be turned or reversed from one position to another.

From the foregoing it is seen that the piston valve 8 and the actuating valve 10 are both subjected and normally maintained closed by the counterbalancing fluid pressure which is supplied from the inlet to the valve chamber 2.

The needle valve 16 provides a simple and convenient means of choking or throttling one of the passages connecting the piston chamber 2 with the inlet and outlet 3—4 so as to produce the desired differential flow through the respective passages and permit comparatively rapid discharge of chamber 2, the consequent closing of the control valve 10 by the piston valve, and the recharging of the chamber, and maintaining both valves closed from the initial pressure. It is to be observed that in whatever position the head 5 is turned the choke is in the inlet side of the apparatus. In other words, the reversible feature resides in a member preferably the ported head having the function of registration with either of the main valve ports 3—4 in conjunction with suitable throttling means for that port which temporarily serves as the inlet port to the piston chamber. The construction illustrated provides a neat, simple, practical, self-contained reversible flush valve. One advantage of this construction is that it makes it possible to connect the toilet directly to the source of water supply through the usual pipe connections, thereby eliminating the use of a tank either in the toilet or in any other part of the building, as is now generally used, thus saving extra piping as well as special apparatus.

When changing the position of the cylinder head to reverse the flow of water through the valve casing, and in order to make the connecting ports to register, it is desirable to provide means by which a positive registering of the ports may be secured. To this end I have provided a dowel pin 25, secured to the cylinder head, which will register or seat itself in the openings 26 in the casing, provided for that purpose.

The flush valve is neat in appearance, prompt and reliable in its actions, and takes no more space than the stool alone. The materials and finish of the several parts of the apparatus are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A device of the class described comprising an outer casing, a cylindrical portion within said outer casing, intake and discharge connections attached to said casing and communicating with the lower end of said cylinder, a valve seat provided in the lower portion of said cylinder, a piston valve arranged to close on said valve seat to shut off communication between the intake and the discharge connections, partitions connecting said outer casing and cylindrical portion in such manner as to provide two ducts, one being connected with the intake opening and the other being connected with the outlet opening, a cylinder head closing the upper end of the cylinder and provided with diametrically oppositely disposed passage ways opening into said cylinder and each communicating with one of said ducts, a needle valve carried by said cylinder head and adapted to control one of said passage ways, and a control valve carried by said cylinder head and provided with a push button, said cylinder head being formed with the passage ways constructed to permit the cylinder head to be reversed whereby the relationship of said passage ways to the ducts is interchanged, substantially as described.

2. A device of the class described comprising an outer casing, a cylindrical portion within said outer casing, intake and discharge connections attached to said casing and communicating with the lower end of said cylinder, a valve seat provided in the lower portion of said cylinder, a piston valve arranged to close on said valve seat to shut off communication between the intake and the discharge connections, partitions connecting said outer casing and cylindrical portion in such manner as to provide two ducts, one being connected with the intake opening and the other being connected with the outlet opening, a cylinder head closing the upper end of the cylinder and provided with diametrically oppositely disposed passage ways opening into said cylinder and each communicating with one of said ducts, and a control valve carried by said cylinder head and provided with a push button, said cylinder head being formed with the passage ways constructed to permit the cylinder head to be reversed whereby the relationship of said passage ways to the ducts is interchanged, substantially as described.

3. A device of the class described comprising an outer casing, a cylindrical portion within said outer casing, intake and discharge connections attached to said casing and communicating with the lower end of said cylinder, a valve seat provided in the lower portion of said cylinder, a piston valve arranged to close on said valve seat to shut off communication between the intake and the discharge connections, partitions connecting said outer casing and cylindrical portion in such manner as to provide two ducts, one being connected with the intake opening and the other being connected with the outlet opening, a cylinder head closing the upper end of the cylinder and provided with diametrically oppositely disposed passage ways opening into said cylinder and each communicating with one of said ducts, means to vary the rate of flow through one of said passage ways, and a control valve carried by said cylinder head and provided with a push button, said cylinder head being formed with the passage ways constructed to permit the cylinder head to be reversed whereby the relationship of said passage ways to the ducts is interchanged, substantially as described.

4. A device of the class described comprising an outer casing, a cylindrical portion within said outer casing, intake and discharge connections attached to said casing and communicating with the lower end of said cylinder, a valve seat provided in the lower portion of said cylinder, a piston valve arranged to close on said valve seat to shut off communication between the intake and the discharge connections, partitions connecting said outer casing and cylindrical portion in such manner as to provide two ducts, one being connected with the intake opening and the other being connected with the outlet opening, a cylinder head closing the upper end of the cylinder and provided with diametrically oppositely disposed passage ways opening into said cylinder and each communicating with one of said ducts, means carried by the head to restrict one of said passage ways and thereby produce a differential flow through them, and a control valve carried by said cylinder head and provided with a push button, said cylinder head being formed with the passage ways constructed to permit the cylinder head to be reversed whereby the relationship of said passage ways to the ducts is interchanged, substantially as described.

5. In a flushing valve, the combination of a valve chamber, intake and discharge connections communicating with said valve chamber, a duct leading into the intake and a duct leading into the discharge, a member having passages adapted to register with said ducts, said passages when in registered position forming in effect parts of the ducts and leading into the valve chamber, a valve in said chamber arranged to normally shut off communication between the intake and the discharge, said valve being maintained in its normal position relative to intake and discharge by a counterbalancing fluid pressure delivered to the valve chamber through one of the ducts and the registered passage in said member, a valve in the other passage in said member which when opened acts to reduce the counterbalancing fluid pressure against the main valve and cause the fluid pressure in the intake to open the valve, whereby communication between intake and discharge is established, and means for adjusting said member to reverse registration of the passages relative to the ducts whereby reversal becomes effective to render the discharge connection the intake and the intake connection the discharge.

6. In a flushing valve, the combination of a valve chamber, intake and discharge connections communicating with the valve chamber, a duct leading into the intake and a duct leading into the discharge, a main valve in said chamber operative to normally shut off communication between the intake and discharge by a counterbalancing fluid pressure opposed to the fluid pressure in the intake, a head closing the valve chamber, and provided with passag s registering with said ducts, one of said passages being arranged to deliver the counterbalancing fluid pressure and the other provided with a valve which when opened affords communication between the valve chamber and the duct leading to the discharge to thereby exhaust the counterbalancing fluid pressure and permit the intake pressure to open the main valve, and means for adjusting said head to reverse the registration of said passages with the ducts, whereby the intake connection becomes the discharge and the discharge connection the intake, permitting reversal of fluid flow through the flushing valve.

7. In a flushing valve, the combination of a valve chamber, intake and discharge connections communicating with the valve chamber, a duct leading into the intake and a duct leading into the discharge, a main valve in said chamber operative to normally shut off communication between the intake and discharge by a counterbalancing fluid pressure opposed to the fluid pressure in the intake, a head closing the valve chamber and provided with a restricted passage adapted to register with the duct leading to the intake and with a valve controlled passage adapted to register with the duct leading to the discharge, both said passages communicating with the interior of the main valve chamber, the restricted passage delivering the counterbalancing fluid pressure and the valved passage upon opening of the valve exhausting the counterbalancing fluid pressure to permit the main valve to open and establish communication between the intake and discharge, and means for adjusting said head to reverse the registration of the passages relative to the ducts whereby the intake connection becomes the discharge and the discharge connection the intake.

8. In a flushing valve, the combination of a valve chamber, intake and discharge connections communicating with the valve chamber, a duct leading into the intake and a duct leading into the discharge, a main valve in said chamber operative to normally shut off communication between the intake and discharge by a counterbalancing fluid pressure opposed to the fluid pressure in the intake and a reversible head closing the valve chamber and provided with a choked passage adapted to register with one duct, and with a valve controlled passage adapted to register with the other duct, both said passages forming extensions of the ducts and communicating with the interior of the main valve chamber, the restricted passage delivering the counterbalancing fluid pressure from its registered duct and the valve passage upon opening of the valve exhausting the counterbalancing fluid pressure through its registered duct to permit the main valve to open and establish communication between the intake and discharge.

9. In a flushing apparatus, the combination with a valve chamber, intake and discharge connections communicating with said chamber, a valve in said chamber operative to normally shut off communication between intake and discharge by a counterbalancing fluid pressure opposed to the fluid pressure in the intake, a duct connecting the intake with the valve chamber for supplying said fluid pressure, and a second duct connecting the valve chamber with the discharge and valve controlled to exhaust the counterbalancing fluid pressure and permit the main valve to open by fluid pressure at the intake, and means for reversing the functions of said ducts relative to fluid pressure control of the main valve, whereby reversal becomes effective to render the discharge connection the intake and the intake connection the discharge.

In testimony whereof I have hereunto set my hand in the presence of two subscribing witnesses.

JOHN B. WILLIAMS.

Witnesses:

JOHN H. HERRING,
W. W. HEALEY.